(12) United States Patent
Sugiyama et al.

(10) Patent No.: US 12,015,134 B2
(45) Date of Patent: Jun. 18, 2024

(54) BATTERY UNIT HAVING CELL STACK, BUS BARS, COOLER, WATERPROOF PLATE, AND HEAT TRANSFER MEMBER

(71) Applicants: TOYOTA JIDOSHA KABUSHIKI KAISHA, Toyota (JP); SUBARU CORPORATION, Tokyo (JP)

(72) Inventors: Hisashi Sugiyama, Toyota (JP); Wataru Kubo, Toyota (JP); Ryota Aoki, Okazaki (JP); Masatoshi Hiyoshi, Toyota (JP); Haruka Tsuruta, Toyota (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 126 days.

(21) Appl. No.: 17/525,506

(22) Filed: Nov. 12, 2021

(65) Prior Publication Data
US 2022/0223941 A1 Jul. 14, 2022

(30) Foreign Application Priority Data
Jan. 12, 2021 (JP) .................................. 2021-003015

(51) Int. Cl.
*H01M 10/65* (2014.01)
*H01M 10/613* (2014.01)
(Continued)

(52) U.S. Cl.
CPC ..... *H01M 10/6554* (2015.04); *H01M 10/613* (2015.04); *H01M 50/20* (2021.01); *H01M 10/625* (2015.04); *H01M 2220/20* (2013.01)

(58) Field of Classification Search
CPC ......... H01M 10/6554; H01M 10/6556; H01M 10/655; H01M 10/6555; H01M 10/613;
(Continued)

(56) References Cited

U.S. PATENT DOCUMENTS

| | | |
|---|---|---|
| 2011/0200862 A1 | 8/2011 | Kurosawa |
| 2016/0141735 A1* | 5/2016 | Motohashi ........ H01M 10/6554 429/120 |
| 2019/0109354 A1 | 4/2019 | Yamashita |

FOREIGN PATENT DOCUMENTS

| | | |
|---|---|---|
| JP | 2011-034775 A | 2/2011 |
| JP | 2011-171029 A | 9/2011 |

(Continued)

*Primary Examiner* — Raymond Alejandro
(74) *Attorney, Agent, or Firm* — Dinsmore & Shohl LLP

(57) ABSTRACT

A battery unit disclosed herein includes a cell stack, bus bars, a cooler, and a heat transfer member. The cell stack includes a first surface and a second surface opposite to the first surface. The cooler includes a cooling surface that faces the second surface of the cell stack to cool the cell stack. The heat transfer member is arranged between the second surface of the cell stack and the cooling surface of the cooler to transfer heat of the cell stack to the cooler. The cooling surface of the cooler has a flat shape. The heat transfer member includes a plurality of bands extending along a stacking direction. The bands are located away from each other. At least one of the bands at least partially overlaps each of electrodes of a plurality of battery cells when viewed in a direction orthogonal to the cooling surface.

6 Claims, 4 Drawing Sheets

(51) Int. Cl.
*H01M 10/6554* (2014.01)
*H01M 50/20* (2021.01)
*H01M 10/625* (2014.01)

(58) Field of Classification Search
CPC .. H01M 10/615; H01M 10/625; H01M 50/20; H01M 50/204; H01M 50/207; H01M 2220/20
See application file for complete search history.

(56) References Cited

FOREIGN PATENT DOCUMENTS

| | | | |
|---|---|---|---|
| JP | 2014-157763 | A | 8/2014 |
| JP | 2016-201186 | A | 12/2016 |
| JP | 2018-037343 | A | 3/2018 |
| JP | 2019-067737 | A | 4/2019 |
| JP | 2020-053148 | A | 4/2020 |
| WO | 2015008563 | A1 | 1/2015 |

* cited by examiner

BATTERY UNIT HAVING CELL STACK, BUS BARS, COOLER, WATERPROOF PLATE, AND HEAT TRANSFER MEMBER

CROSS-REFERENCE TO RELATED APPLICATION

This application claims priority to Japanese Patent Application No. 2021-003015 filed on Jan. 12, 2021, incorporated herein by reference in its entirety.

BACKGROUND

1. Technical Field

The technology disclosed herein relates to a battery unit. In particular, the technology disclosed herein relates to a battery unit including a cell stack including a plurality of cells stacked in a stacking direction, a cooler, and a heat transfer member.

2. Description of Related Art

The battery unit described above is disclosed in Japanese Unexamined Patent Application Publication No. 2020-053148 (JP 2020-053148 A). Heat generated from the cell stack (referred to as "plurality of battery cells" in JP 2020-053148 A) is transferred to the cooler via the heat transfer member which is in the form of gel. In JP 2020-053148 A, at a surface of the cooler that faces the cell stack, there is a plurality of main cooling surfaces that holds the heat transfer member with the cell stack, and recesses each located between the main cooling surfaces and spaced farther away from the cell stack than the main cooling surfaces. Thus, the heat transfer member in the form of gel that is pushed out of spaces between the cell stack and the main cooling surfaces enters the recesses. By holding the pushed out heat transfer member in the recesses, the heat transfer member can be prevented from moving to undesired parts.

SUMMARY

In the battery unit of JP 2020-053148 A, the heat transfer member that enters the recesses does not abut against the cell stack, and does not therefore contribute to cooling of the cell stack. As a result, the mass of the heat transfer member that does not contribute to the cooling increases. In a case where the recesses are filled with the heat transfer member so that the heat transfer member abuts against the cell stack, the amount of the heat transfer member used increases, and the mass increases. Since irregularities are formed on the cooling surfaces that face the cell stack, the surface area of the cooler increases. As a result, the mass of the cooler increases. The present disclosure provides a technology for cooling the cell stack while suppressing the increase in the mass and the increase in the amount of the heat transfer member used.

A battery unit disclosed herein includes a cell stack, a plurality of bus bars, a cooler, and a heat transfer member. The cell stack includes a plurality of battery cells stacked along a stacking direction. The cell stack includes a first surface where electrodes of the battery cells are disposed, and a second surface opposite to the first surface. The bus bars are each connected to at least one of the electrodes of the battery cells to electrically connect the battery cells. The cooler includes a cooling surface that faces the second surface of the cell stack to cool the cell stack. The heat transfer member is arranged between the second surface of the cell stack and the cooling surface of the cooler to transfer heat of the cell stack to the cooler. The cooling surface of the cooler has a flat shape. The heat transfer member includes a plurality of bands extending along the stacking direction while facing the battery cells. The bands are located away from each other in a direction perpendicular to the stacking direction. At least one of the bands at least partially overlaps each of the electrodes of the battery cells when viewed in a direction orthogonal to the cooling surface.

In each battery cell, a current flows into one electrode, and flows out from the other electrode. Therefore, the current is likely to be dense at the electrodes in each battery cell, and the temperature is likely to be high at the electrodes and at portions near the electrodes. Also, since the bus bars are connected to the electrodes of the battery cell, heat generated by the bus bars is likely to further heat the electrodes up. As a result, the amount of heat generation at the electrodes of the battery cell and at portions near the electrodes is likely to be larger than that at other parts of the battery cell. In the battery unit described above, at least one of the bands of the heat transfer member at least partially overlaps each of the electrodes when viewed in the direction orthogonal to the cooling surface. Thus, the heat generated at the electrodes and at portions near the electrodes is likely to be transferred to the cooler via the heat transfer member at positions which overlap with the electrodes. That is, the heat transfer member is likely to cool portions near the electrodes where the temperature is likely to be high. Also, the bands of the heat transfer member are located away from each other in the direction perpendicular to the stacking direction. Thus, the amount of the heat transfer member used can be reduced as compared to a case where the heat transfer member is arranged over the entire cooling surface. Further, since the cooling surface of the cooler has a flat shape, the mass of the cooler itself can be reduced as compared to the related art in which the cooling surface has irregularities. In the battery unit disclosed in the present disclosure, the connecting portion between the cell and the bus bar having a large amount of heat generation can be cooled by a relatively small amount of the heat transfer member while suppressing an increase in the mass.

In the battery unit, the bands may include at least one set of band-shaped portions spaced from each other in a width direction by a first distance, and at least one other set of band-shaped portions spaced from each other in the width direction by a second distance.

In the battery unit, the heat transfer member may be in a form of gel.

In the battery unit, the heat transfer member may also function as an adhesive for fixing the cooling surface to the second surface.

In the battery unit, each of the battery cells may be a rectangular cell having a flat rectangular shape in the stacking direction.

In the battery unit, the cooler may include a channel where a coolant for cooling the cell stack circulates. The channel may extend along the stacking direction while facing the battery cells.

The battery unit may further include a waterproof plate arranged between the second surface of the cell stack and the cooling surface of the cooler to cover the cooling surface. The heat transfer member may be located at one of a position between the cell stack and the waterproof plate and a position between the waterproof plate and the cooling surface.

The battery unit may further include a second heat transfer member located at another of the position between the cell stack and the waterproof plate and the position between the waterproof plate and the cooling surface. The second heat transfer member may be symmetrical to the heat transfer member across a symmetry plane that is the waterproof plate.

Details and further improvements of the technology disclosed herein are described in the "DETAILED DESCRIPTION OF EMBODIMENTS" section.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
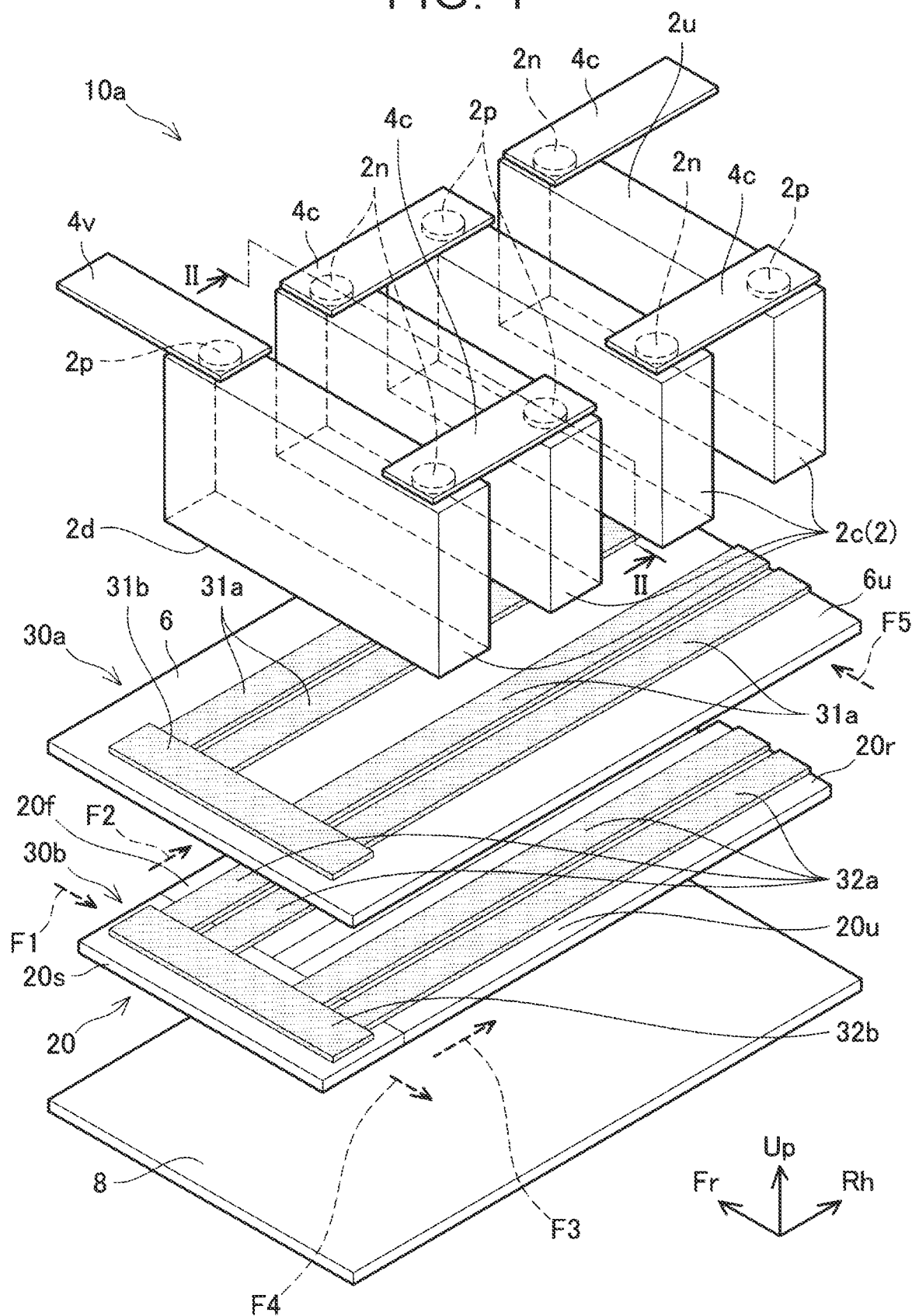
FIG. 1 is a perspective view illustrating the structure of a battery unit 10a of a first embodiment.

In one embodiment of the present disclosure, a plurality of bands may include at least one set of band-shaped portions spaced from each other in a width direction (width direction of the band) by a first distance, and at least one other set of band-shaped portions spaced from each other in the width direction by a second distance. With this structure, the degree of freedom in terms of arrangement of a heat transfer member is improved, thereby facilitating the arrangement of the heat transfer member based on positions near electrodes having a large amount of heat generation.

In one embodiment of the present disclosure, the heat transfer member may be in a form of gel. With this structure, the heat transfer member can be arranged relatively easily based on the positions near the electrodes having a large amount of heat generation.

In one embodiment of the present disclosure, the heat transfer member may also function as an adhesive for fixing a cooling surface to a second surface. With this structure, misalignment of the cooling surface and the second surface can be suppressed.

In one embodiment of the present disclosure, each of the battery cells may be a rectangular cell having a flat rectangular shape in a stacking direction. In other embodiments, each battery cell may be, for example, a cylindrical cell.

In one embodiment of the present disclosure, a cooler may include a channel where a coolant for cooling a cell stack circulates. The channel may extend along the stacking direction while facing the battery cells. With this structure, the bands of the heat transfer member extend along the channel of the cooler. As a result, the contact area between the bands of the heat transfer member and the channel of the cooler increases. Thus, heat of the cell stack is transferred to the coolant via the heat transfer member more easily.

In one embodiment of the present disclosure, a waterproof plate may be arranged between the second surface of the cell stack and the cooling surface of the cooler to cover the cooling surface. In this case, the heat transfer member may be located at one of a position between the cell stack and the waterproof plate and a position between the waterproof plate and the cooling surface. With this structure, when the coolant leaks out of the cooler, the leaked coolant can be prevented from reaching the cell stack.

In this case, a second heat transfer member may be located at another of the position between the cell stack and the waterproof plate and the position between the waterproof plate and the cooling surface. The second heat transfer member may be symmetrical to the heat transfer member across a symmetry plane that is the waterproof plate. With this structure, the heat of the cell stack is first transferred to the heat transfer member located between the second surface and the waterproof plate, and then transferred to the cooler via the heat transfer member located between the cooler and the waterproof plate. Since the heat transfer members are symmetrical across the waterproof plate, the heat is easily transferred between the heat transfer members.

EMBODIMENTS

Battery units of embodiments are described with reference to the drawings. FIG. 1 is a perspective view of a battery unit 10a of a first embodiment. To facilitate understanding of the structure of the battery unit 10a, FIG. 1 illustrates disassembled components. The battery unit 10a is, for example, mounted below a floor panel (not illustrated) of an electric vehicle. The battery unit 10a forms a battery that stores electric power for driving the electric vehicle. FIG. 1 illustrates only a part of the battery unit 10a. The battery unit 10a further extends in a width direction of the electric vehicle (that is, an arrow Rh direction in FIG. 1). The battery unit 10a is arranged over the entire area below the floor panel of the electric vehicle. In the present disclosure, an arrow Fr in the drawings indicates a front side in a front-rear direction of the electric vehicle (longitudinal direction), the arrow Rh indicates a right side in a lateral direction of the electric vehicle (width direction), and an arrow Up indicates an upper side in a vertical direction of the electric vehicle (height direction).

The battery unit 10a includes a cell stack 2, a plurality of bus bars 4v and 4c, a lower case 6, a cooler 20, an under panel 8, a cell-side heat transfer member 30a, and a cooler-side heat transfer member 30b. The cell stack 2 includes a plurality of battery cells 2c stacked along the width direction (that is, the arrow Rh direction). Although FIG. 1 illustrates only four battery cells 2c out of the plurality of battery cells 2c of the cell stack 2, more battery cells 2c are stacked in actuality. Each battery cell 2c has a flat rectangular shape in its stacking direction (that is, the arrow Rh direction). That is, each battery cell 2c is a so-called rectangular cell. The battery cells 2c forming the cell stack 2 each have the same structure, and therefore one battery cell 2c is described below.

Although illustration is omitted, the battery cell 2c is a secondary battery that houses a negative-pole material, a positive-pole material, a separator that separates the negative-pole material and the positive-pole material and so on. The battery cell 2c is a lithium ion battery using an oxide including lithium as the positive-pole material. A positive electrode 2p is provided at one end on the upper surface of the battery cell 2c. A negative electrode 2n is provided at the other end on the upper surface of the battery cell 2c. The battery cell 2c stores electric power due to lithium ions (not illustrated) in the battery cell 2c moving from the positive electrode 2p toward the negative electrode 2n. The battery cell 2c discharges electric power due to the lithium ions (not illustrated) in the battery cell 2c moving from the negative electrode 2n toward the positive electrode 2p.

As illustrated in FIG. 1, when the battery cells 2c are stacked in the width direction, the electrodes 2p and 2n of the battery cells 2c are alternately arranged along the stacking direction on an upper surface 2u of the cell stack 2. The bus bars that made of copper plates are connected to the electrodes 2p and 2n of the battery cells 2c. A device-side bus bar 4v is arranged on the positive electrode 2p of the battery cell 2c located on the leftmost side in FIG. 1 (that is, a near side of the drawing sheet). The device-side bus bar 4v is connected to a power converter (not illustrated) on its front side. The positive electrode 2p and the negative electrode 2n of adjacent battery cells 2c are connected by a connection bus bar 4c. That is, the battery cells 2c are connected in series. A current flows through the battery cells 2c via the device-side bus bar 4v and the connection bus bars 4c. As a result, the cell stack 2 generates heat.

A bottom wall of the lower case 6 is arranged below a lower surface 2d opposite to the upper surface 2u of the cell stack 2. Although FIG. 1 illustrates only the bottom wall of the lower case 6, the lower case 6 is a box-shaped sheet metal component that covers the cell stack 2 from the bottom. Although details are described later, a coolant circulates in the cooler 20 arranged below the lower case 6. By covering the cell stack 2 with the lower case 6 from the bottom, the coolant can be prevented from adhering to the cell stack 2 even if the coolant leaks out of the cooler 20. The cell-side heat transfer member 30a is arranged between the lower case 6 and the cell stack 2. The cell-side heat transfer member 30a includes one band 31b extending in the front-rear direction, and four bands 31a extending in the width direction (that is, the stacking direction of the battery cells 2c). The band 31b extends in the front-rear direction at the left end of an upper surface 6u of the lower case 6. The bands 31a extend in the width direction across the battery cells 2c of the cell stack 2. As a result, the bands 31a face the plurality of battery cells 2c. The bands 31a extend in the width direction in parallel to each other. That is, the bands 31a are spaced from each other in a direction perpendicular to the stacking direction on the upper surface 6u of the lower case 6. The cell-side heat transfer member 30a arranged in a band shape on the upper surface 6u is a semisolid (that is, a gel). Therefore, the cell-side heat transfer member 30a is easily arranged on the upper surface 6u of the lower case 6. Details of the arrangement of the cell-side heat transfer member 30a are described later with reference to FIG. 2.

Since the cell stack 2 generates heat due to the current as described above, the cooler 20 for cooling the cell stack 2 is arranged below the lower case 6. A coolant circulation channel (not illustrated) where the coolant circulates is connected to the cooler 20. The cooler 20 includes a left channel 20s, a right channel (not illustrated), a front channel 20f, and a rear channel 20r. Each of the channels 20s, 20f, and 20r is hollow, and the coolant circulates through the channels 20s, 20f, and 20r. The left channel 20s located at the left end of the cooler 20 extends in the longitudinal direction (that is, a lateral direction on the drawing sheet of FIG. 1). The front channel 20f and the rear channel 20r extend in the lateral direction (that is, a depth direction on the drawing sheet of FIG. 1). The front channel 20f and the rear channel 20r extend in the width direction across the battery cells 2c of the cell stack 2. As a result, the front channel 20f and the rear channel 20r face the plurality of battery cells 2c. The coolant flowing into the cooler 20 from the coolant circulation channel (see a dashed arrow F1) flows in a rightward direction through the front channel 20f (see a dashed arrow F2). Similarly, the coolant that has flowed through the left channel 20s (see a dashed arrow F4) flows in a rightward direction through the rear channel 20r (see a dashed arrow F3). The coolant that flowed through the front channel 20f and the rear channel 20r flows in a forward direction (see a dashed arrow F5) through a right channel (not illustrated) located at the right end of the cooler 20. The coolant circulates in a ladder pattern through the cooler 20 to cool the cell stack 2.

A cooling surface 20u that is the upper surface of the cooler 20 faces the lower surface 2d of the cell stack 2. The cooler-side heat transfer member 30b is arranged on the cooling surface 20u. The cooler-side heat transfer member 30b is made of a material similar to that of the cell-side heat transfer member 30a. Similarly to the cell-side heat transfer member 30a, the cooler-side heat transfer member 30b includes one band 32b extending in the front-rear direction, and four bands 32a extending in the width direction (that is, the stacking direction of the battery cells 2c). The band 32b located at the left end of the cooler 20 extends in the front-rear direction. The bands 32a extend in the width direction across the battery cells 2c of the cell stack 2. As a result, the bands 32a face the plurality of battery cells 2c. The bands 32a extend in the width direction in parallel to each other. That is, the bands 32a are spaced from each other in a direction perpendicular to the stacking direction on the cooling surface 20u. Thus, the bands 32a of the cooler-side heat transfer member 30b are arranged similarly to the bands 31a of the cell-side heat transfer member 30a. As a result, the bands 32a are symmetrical to the bands 31a across a symmetry plane that is the lower case 6.

The under panel 8 is arranged below the cooler 20. The under panel 8 is made of sheet metal component, and covers the cooler 20 from the bottom.

Figure 2:
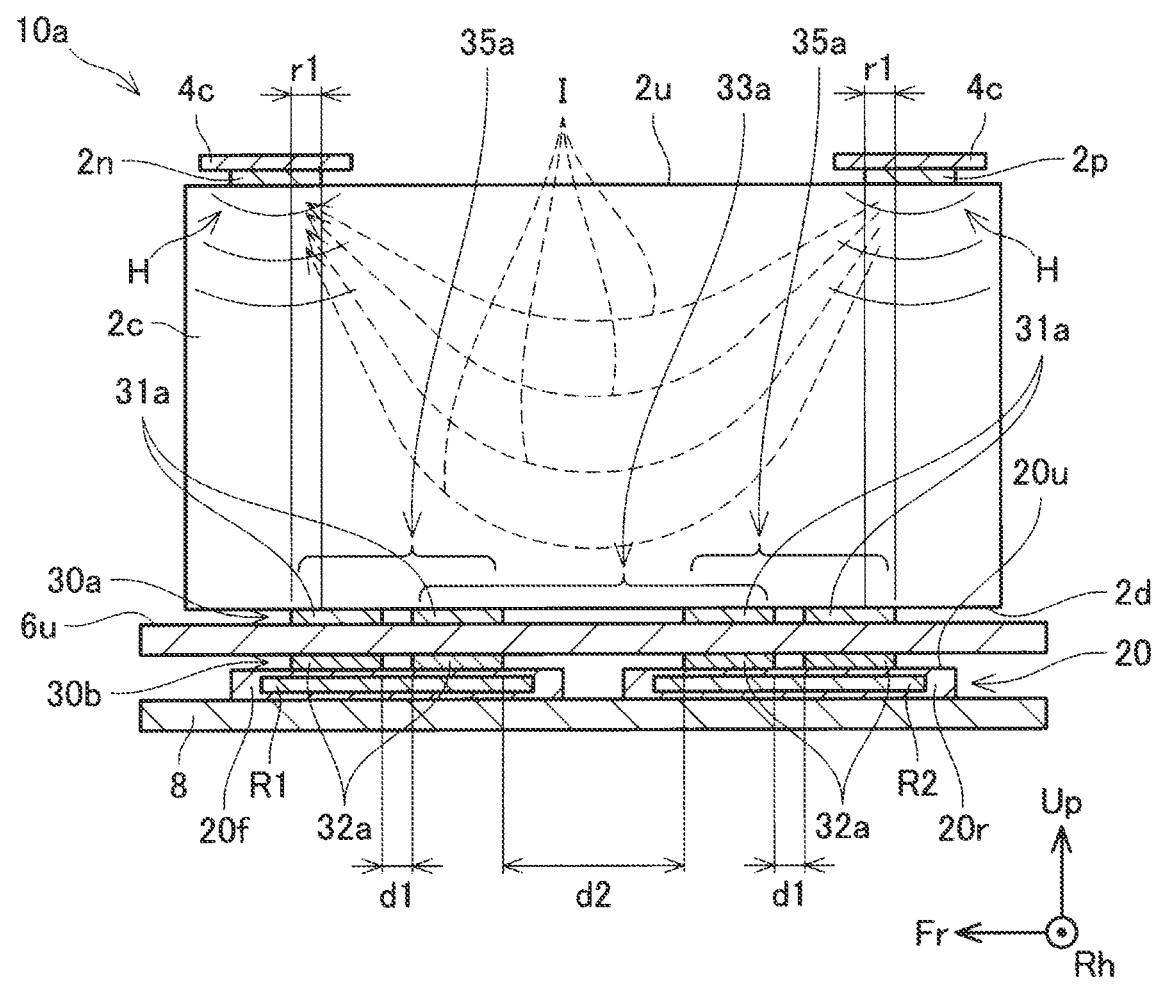
FIG. 2 is a sectional view taken along a line II-II in FIG. 1.

Details of the structure of the battery unit 10a are described with reference to FIG. 2. FIG. 2 is a sectional view of one battery cell 2c out of the plurality of battery cells 2c of the cell stack 2 (see FIG. 1). The other battery cells 2c have similar structures. To facilitate understanding of the drawings, hatching of the battery cell 2c is omitted in FIG. 2 to FIG. 4.

For example, when the battery cell 2c stores electric power, a current transferred to the positive electrode 2p via the connection bus bar 4c, while moving the lithium ions in the battery cell 2c from the positive electrode 2p to the negative electrode 2n, flows to another connection bus bar 4c via the negative electrode 2n. As indicated by dashed arrows I in FIG. 2, the current enters the battery cell 2c from the positive electrode 2p, and then temporarily spreads in the vertical direction inside the battery cell 2c. The spreading current converges at the negative electrode 2n again, and flows toward an adjacent battery cell 2c via the connection bus bar 4c. Therefore, the current near the electrodes 2p and 2n is likely to be denser than that at other parts of the battery cell 2c. As a result, the temperature near the electrodes 2p and 2n is more likely to be high as compared to other parts of the battery cell 2c. The electrodes 2p and 2n are connected to the connection bus bars 4c. Since the connection bus bar 4c is made of copper plate as described above, the connection bus bar 4c generates heat due to the current flow. The heat of the connection bus bars 4c is transferred to the battery cell 2c via the electrodes 2p and 2n. As a result, the temperature in the battery cell 2c is highest near the electrodes 2p and 2n. When the temperature of the battery cell 2c partially increases, the lithium ions in the battery cell 2c move in an uneven manner. Thus, the life of the battery cell 2c may decrease.

In the battery unit 10a of this embodiment (see FIG. 1), the cell-side heat transfer member 30a is arranged between the lower surface 2d of the cell stack 2 and the upper surface 6u of the lower case 6. As described with reference to FIG. 1, the cell-side heat transfer member 30a includes four bands 31a, and the bands 31a are arranged away from each other in the longitudinal direction (that is, a lateral direction on the drawing sheet of FIG. 2). The bands 31a are separated into a set of band-shaped portions 35a on the positive electrode 2p side, and a set of band-shaped portions 35a on the negative electrode 2n side. The battery unit 10a of the first embodiment has a bilaterally symmetrical shape across a symmetry plane at the center in the longitudinal direction. Therefore, the set of band-shaped portions 35a on the positive electrode 2p side is mainly described below. The set of band-shaped portions 35a on the positive electrode 2p side may hereinafter be referred to simply as "band-shaped portions 35a".

As indicated by arcs H in FIG. 2, heat near the positive electrode 2p is transferred inside the battery cell 2c from the positive electrode 2p toward the cooler 20 while spreading in the longitudinal direction. A right band 31a in the band-shaped portions 35a is arranged immediately below the positive electrode 2p. The right band 31a overlaps with the positive electrode 2p by a length r1 when viewed in a direction orthogonal to the upper surface 6u of the lower case 6 (that is, the arrow Up direction). In other words, the right band 31a is arranged closest to the positive electrode 2p on the upper surface 6u. Therefore, the heat near the positive electrode 2p is likely to be transferred to the right band 31a. Thus, the heat near the positive electrode 2p is unlikely to be transferred to other portions in the battery cell 2c. That is, the heat near the positive electrode 2p is unlikely to increase the temperatures of the other portions in the battery cell 2c.

The heat near the positive electrode 2p spreads inside the battery cell 2c in the manner indicated by the arcs H. Therefore, the temperature near a portion immediately below the positive electrode 2p may increase. The band-shaped portions 35a include a left band 31a spaced from the right band 31a by a distance d1 in the longitudinal direction (that is, a width direction of the band 31a). The heat near the positive electrode 2p is likely to be transferred to the two bands 31a of the band-shaped portions 35a arranged near a portion immediately below the positive electrode 2p.

The center of the battery cell 2c in the longitudinal direction (that is, the lateral direction on the drawing sheet of FIG. 2) is spaced from the positive electrode 2p. Therefore, the heat near the positive electrode 2p is unlikely to be transferred to the center. The bands 31a of a set of band-shaped portions 33a located at the center of the battery cell 2c in the longitudinal direction are spaced from each other by a distance d2 in the longitudinal direction (that is, the width direction of the band 31a). As illustrated in FIG. 2, the distance d2 is longer than the distance d1. In the battery unit 10a, the bands 31a of the cell-side heat transfer member 30a are arranged at the short distance d1 as the set of band-shaped portions 35a near the portion immediately below each of the electrodes 2p and 2n where the temperature is likely to be high, and are arranged at the long distance d2 as the set of band-shaped portions 33a near the center where the temperature is unlikely to be high. In the battery unit 10a, the bands 31a are densely arranged near the portion immediately below each of the electrodes 2p and 2n where the temperature is likely to be high, and a smaller number of bands 31a are arranged at the other portion. Thus, in the battery unit 10a, the portions near the electrodes 2p and 2n of the battery cell 2c where the temperature is likely to be high can efficiently be cooled by a relatively small amount of the cell-side heat transfer member 30a.

The heat transferred to the bands 31a is transferred to the bands 32a of the cooler-side heat transfer member 30b via the lower case 6. As described above, the bands 32a of the cooler-side heat transfer member 30b are symmetrical to the bands 31a of the cell-side heat transfer member 30a across the symmetry plane that is the lower case 6. As a result, each band 32a is arranged immediately below the symmetrical band 31a. Therefore, the heat transferred to each band 31a is likely to be transferred to the band 32a arranged immediately below the band 31a. As a result, the cooler-side heat transfer member 30b can efficiently transfer the heat of the cell-side heat transfer member 30a to the cooler 20 via the bands 32a. The heat transferred to the bands 32a of the cooler-side heat transfer member 30b is transferred to coolants R1 and R2 in the cooler 20 via the cooling surface 20u of the cooler 20. As a result, the heat near each of the electrodes 2p and 2n is released to the coolants, thereby cooling the battery cell 2c.

As illustrated in FIG. 2, the cooling surface 20u of the cooler 20 has no irregularities. That is, the cooling surface 20u has a flat shape. When the band 32a in the form of gel is pressed by the lower surface of the lower case 6 and the cooling surface 20u during manufacture of the battery unit 10a, the band 32a easily spreads in the longitudinal direction (that is, the width direction of the band). As a result, the range of interposition of the cooler-side heat transfer member 30b between the lower surface of the lower case 6 and the cooling surface 20u can be increased without increasing the amount of the cooler-side heat transfer member 30b used. Thus, the cooling efficiency can be improved without increasing the amount of the cooler-side heat transfer member 30b used. Since the cooling surface 20u has the flat shape, an increase in the sectional area of the cooler 20 can be suppressed. As a result, an increase in the mass of the cooler 20 can be suppressed. The "flat shape" mentioned herein is at least a shape without irregularities having a thickness larger than the thicknesses of each of the heat transfer members 30a and 30b.

Each of the cell-side heat transfer member 30a and the cooler-side heat transfer member 30b in the form of gel also functions as an adhesive. Therefore, the lower surface 2d of the cell stack 2 (see FIG. 1) and the upper surface 6u of the lower case 6 are fixed by the cell-side heat transfer member 30a. Further, the lower surface of the lower case 6 and the cooling surface 20u of the cooler 20 are fixed by the cooler-side heat transfer member 30b. Since each of the heat transfer members 30a and 30b also functions as the adhesive, it is unlikely that the cell stack 2, the lower case 6, and the cooler 20 are misaligned relatively.

In the first embodiment, the distance d1 is an example of "first distance", and the distance d2 is an example of "second distance". The upper surface 2u of the cell stack 2 is an example of "first surface", and the lower surface 2d of the cell stack 2 is an example of "second surface". The cell-side heat transfer member 30a is an example of "second heat transfer member". The lower case 6 is an example of "waterproof plate".

Battery units 10b and 10c of other embodiments are described below with reference to FIG. 3 and FIG. 4. The battery unit 10b of the second embodiment illustrated in FIG. 3 differs from the battery unit 10a of the first embodiment in terms of arrangement of a cell-side heat transfer member 30c and in that the lower case 6 is not provided. The battery unit 10c of the third embodiment illustrated in FIG.

4 differs from the battery unit 10a of the first embodiment in that the cell-side heat transfer member 30a is changed to a cell-side heat transfer member 30d. The battery unit 10b of the second embodiment and the battery unit 10c of the third embodiment are similar to the battery unit 10a of the first embodiment in terms of the other parts.

Figure 3:
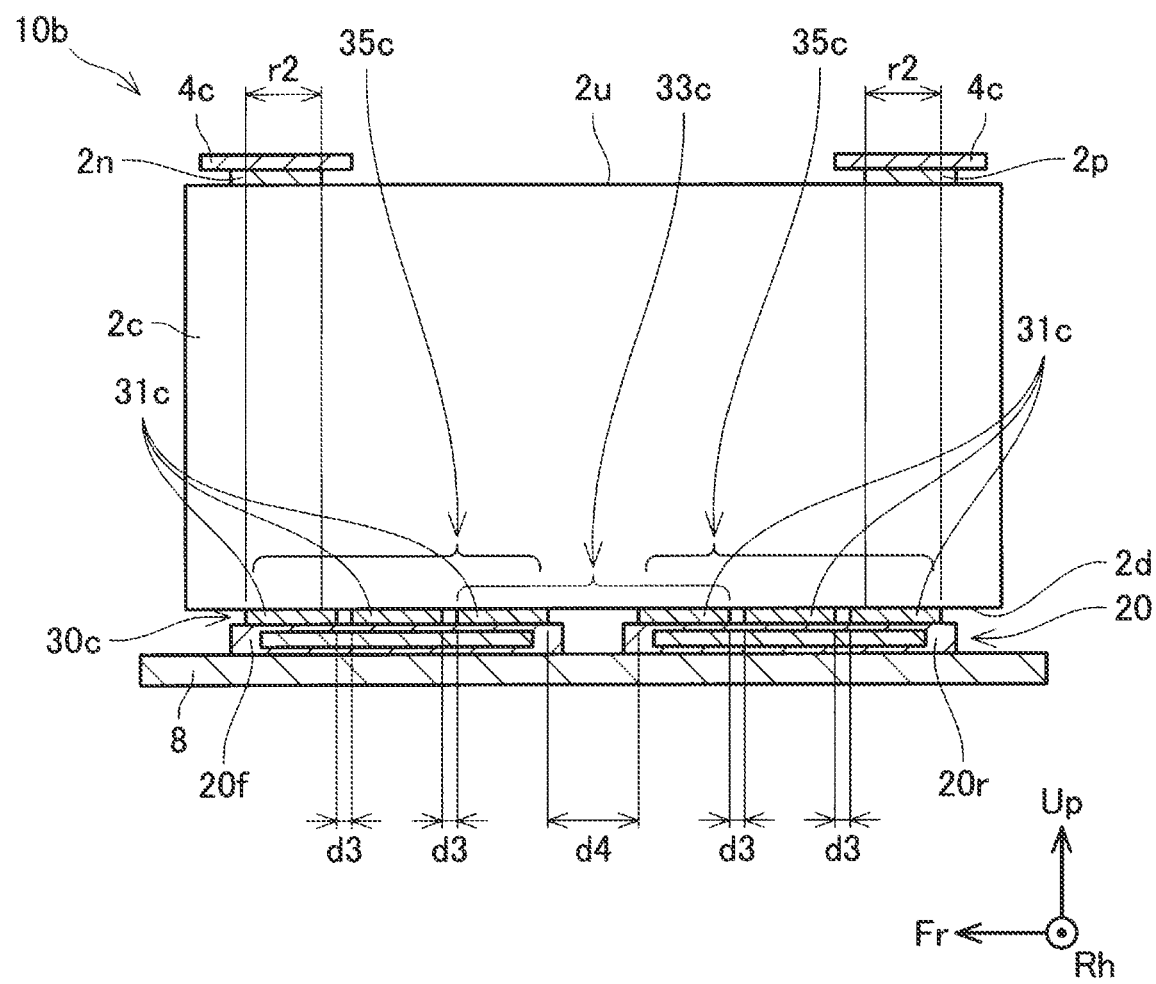
FIG. 3 is a sectional view similar to FIG. 2, illustrating a battery unit 10b of a second embodiment.

In the battery unit 10b of the second embodiment illustrated in FIG. 3, the lower surface 2d of the cell stack 2 faces the cooling surface 20u of the cooler 20 without intervention of the lower case 6 (see FIG. 2). As a result, the cell-side heat transfer member 30c abuts against both the lower surface 2d of the cell stack 2 and the cooling surface 20u of the cooler 20. The cell-side heat transfer member 30c includes six bands 31c. The bands 31c are separated into a set of band-shaped portions 35c including three bands 31c on the positive electrode 2p side, and a set of band-shaped portions 35c including three bands 31c on the negative electrode 2n side. The battery unit 10b of the second embodiment has a bilaterally symmetrical shape across a symmetry plane at the center in the longitudinal direction. Therefore, mainly the band-shaped portions 35c on the positive electrode 2p side are described herein simply as "band-shaped portions 35c".

The bands 31c of the band-shaped portions 35c are located away from each other by a distance d3 in the longitudinal direction (that is, a width direction of the band 31c). A right-end band 31c of the band-shaped portions 35c is arranged immediately below the positive electrode 2p. The right-end band 31c overlaps with the positive electrode 2p by a length r2 when viewed in a direction orthogonal to the cooling surface 20u of the cooler 20 (that is, the arrow Up direction). Therefore, the right-end band 31c can transfer the heat near the positive electrode 2p to the cooler 20 before the heat is transferred to other portions of the battery cell 2c.

As illustrated in FIG. 3, the bands 31c of a set of band-shaped portions 33c located at the center of the battery cell 2c are arranged away from each other by a distance d4 in the width direction of the band 31c. The distance d4 is longer than the distance d3. In the battery unit 10b of the second embodiment, the bands 31c are densely arranged to be away from each other by the short distance d3 near the portion immediately below the positive electrode 2p, and are arranged to be away from each other by the long distance d4 near the center where the temperature is unlikely to be high. Thus, in the battery unit 10b, the portions near the electrodes 2p and 2n of the battery cell 2c where the temperature is likely to be high can efficiently be cooled by a relatively small amount of the cell-side heat transfer member 30c.

In the second embodiment, the distance d3 is an example of "first distance", and the distance d4 is an example of "second distance".

Figure 4:
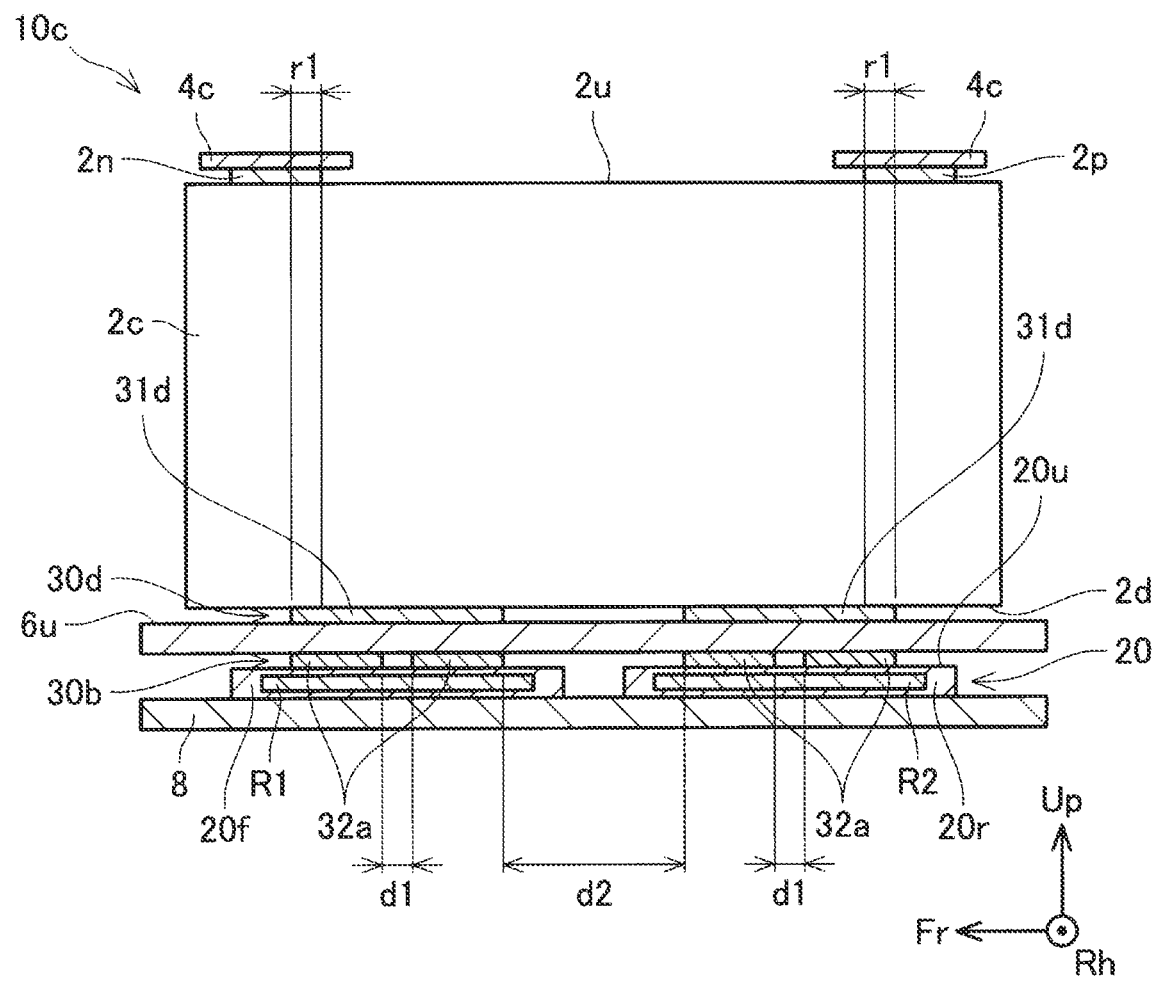
FIG. 4 is a sectional view similar to FIG. 2, illustrating a battery unit 10c of a third embodiment.

The battery unit 10c of the third embodiment illustrated in FIG. 4 includes the cell-side heat transfer member 30d in place of the cell-side heat transfer member 30a of the battery unit 10a of the first embodiment. The cell-side heat transfer member 30d includes two heat transfer sheets 31d. Similarly to the band 32a, each heat transfer sheet 31d extends in the stacking direction (that is, a depth direction on the drawing sheet of FIG. 4). The heat transfer sheets 31d are bilaterally symmetrical across a symmetry plane at the center in the longitudinal direction (that is, a lateral direction on the drawing sheet of FIG. 4). Therefore, the heat transfer sheet 31d on the positive electrode 2p side is mainly described below.

The heat transfer sheet 31d on the positive electrode 2p side is arranged immediately above two bands 32a on the positive electrode 2p side. As a result, the heat transfer sheet 31d on the positive electrode 2p side is located immediately below the positive electrode 2p. That is, the heat transfer sheet 31d on the positive electrode 2p side overlaps with the positive electrode 2p by the length r1 when viewed in the direction orthogonal to the upper surface 6u of the lower case 6 (that is, the arrow Up direction). As described with reference to FIG. 2, the heat near the positive electrode 2p is transferred to the heat transfer sheet 31d on the positive electrode 2p side before the heat is transferred to other portions in the battery cell 2c. The heat transferred to heat transfer sheet 31d on the positive electrode 2p side is transferred to the cooler 20 via the lower case 6 and the cooler-side heat transfer member 30b. Thus, the cell stack 2 is cooled. By changing the arrangements and materials of the cell-side heat transfer member 30d and the cooler-side heat transfer member 30b, the degree of freedom can be improved in the manufacturing process of the battery unit 10c.

In the third embodiment, the cell-side heat transfer member 30d is an example of "second heat transfer member".

Although the specific examples of the present disclosure are described above in detail, the examples are only illustrative and are not intended to limit the claims. The technologies described in the claims encompass various modifications and changes to the specific examples described above. The technical elements disclosed herein or illustrated in the drawings exert technical utility solely or in various combinations, and are not limited to the combination described in the claims as filed. The technologies disclosed herein or illustrated in the drawings may simultaneously achieve a plurality of objects, and exert technical utility by achieving one of the objects.

What is claimed is:

1. A battery unit comprising:
   a cell stack including a plurality of battery cells stacked along a stacking direction, each of the plurality of battery cells includes a pair of electrodes, the cell stack including a first surface where the pair of electrodes of each of the plurality of battery cells are disposed, and a second surface opposite to the first surface;
   a plurality of bus bars each connected to at least one of the pair of electrodes of each of the plurality of battery cells to electrically connect the plurality of battery cells;
   a cooler including a cooling surface that faces the second surface of the cell stack to cool the cell stack, the cooler includes a channel where a coolant for cooling the cell stack circulates, the channel extending along the stacking direction while facing the plurality of battery cells; and
   a waterproof plate arranged between the second surface of the cell stack and the cooling surface of the cooler to cover the cooling surface;
   a heat transfer member arranged between the second surface of the cell stack and the cooling surface of the cooler to transfer heat of the cell stack to the cooler, wherein:
   the cooling surface of the cooler has a flat shape;
   the heat transfer member includes a plurality of bands extending along the stacking direction while facing the plurality of battery cells;
   the plurality of bands are located away from each other in a direction perpendicular to the stacking direction;
   at least one of the plurality of bands at least partially overlaps each of the pair of electrodes of each of the plurality of battery cells when viewed in a direction orthogonal to the cooling surface; and the heat transfer member is located at one of a position between the cell stack and the waterproof plate and a position between the waterproof plate and the cooling surface.

2. The battery unit according to claim 1, wherein the plurality of bands include:
at least one set of band-shaped portions spaced from each other in a width direction by a first distance; and
at least one other set of band-shaped portions spaced from each other in the width direction by a second distance.

3. The battery unit according to claim 1, wherein the heat transfer member is in a form of gel.

4. The battery unit according to claim 1, wherein the heat transfer member also functions as an adhesive for fixing the cooling surface to the second surface.

5. The battery unit according to claim 1, wherein each of the plurality of battery cells is a rectangular cell having a flat rectangular shape in the stacking direction.

6. The battery unit according to claim 1, further comprising
a second heat transfer member located at another of the position between the cell stack and the waterproof plate and the position between the waterproof plate and the cooling surface, wherein
the second heat transfer member is symmetrical to the heat transfer member across a symmetry plane that is the waterproof plate.

\* \* \* \* \*